March 12, 1963    C. L. PETERSON    3,080,597
CONTOUR SCRAPER FOR DISC FILTERS
Filed Feb. 19, 1959    2 Sheets-Sheet 1

INVENTOR.
C. LYNN PETERSON
BY
ATTORNEY

March 12, 1963  C. L. PETERSON  3,080,597
CONTOUR SCRAPER FOR DISC FILTERS
Filed Feb. 19, 1959  2 Sheets-Sheet 2

INVENTOR.
C. LYNN PETERSON
BY
*M. Grew ay Edwards*
ATTORNEY

_United States Patent Office_

3,080,597
Patented Mar. 12, 1963

3,080,597
CONTOUR SCRAPER FOR DISC FILTERS
C. Lynn Peterson, Salt Lake City, Utah, assignor to Peterson Filters and Engineering Company, Salt Lake City, Utah, a corporation of Utah
Filed Feb. 19, 1959, Ser. No. 794,283
8 Claims. (Cl. 15—256.5)

This invention relates to scrapers for rotary filters, and more particularly to scrapers for scraping filter cake from the filter media of disc type filters.

One type of continuous rotary filter operates by having an annular filter medium rotate through a pool of filterable slurry with the inner side of the portion of the filter medium submerged in the pool subjected to a reduced pressure for drawing liquid through the medium and depositing solids on its outside as a filter cake. Normally, such filters operate with about half of the annular filter medium submerged in the slurry and the remainder in the atmosphere. During travel of the filter cake through the atmosphere the filter cake is subjected to washing and drying actions and is then subjected to a cake removal action. Cake removal is normally achieved by blowing air through the filter medium from the inner side as to blow the cake from the outside of the filter medium. To aid removal of the cake from the filter medium, a scraper may be positioned to scrape the cake from the filter medium while it is under the influence of the blow-back air pressure.

Disc filters are constructed as a series of relatively thin, truncated wedges mounted in annular arrangement to form a disc. Generally, each sector is covered by a bag made of filter medium, and such bags are tied at their lower ends to the sector bells and held at their outer ends. Since the filter medium or filter cloth bag is normally only secured at its outer and inner ends, blow-back pressure subjected internally of the bag bulges outwardly its sides. The greatest displacement of the bag on such bulging, of course, is along the middle portion of the sector. Thus when such a bulging filter medium comes in contact with the scraper, the filter medium drags across the scraper causing wear.

A number of attempts have been made to overcome the effects of this filter medium bulging. In one such method, wires have been wrapped around the sector to hold the filter medium bag tightly on the filter sector. Since there are a substantial number of sectors in each disc and a substantial number of discs in each filter, the expense of wrapping wire around each sector greatly exceeds the savings achieved by extended bag life. In another attempt, a rubber scraper blade was stretched across the radial span of the bag. However, unless such a rubber blade is supported along its length, it curls downwardly under the influence of the bulging bag and is thus inoperative. If, on the other hand, such a rubber blade is supported by enough lengthwise reinforcing to stop the curling, it is too stiff and it cannot contour along the bulge line of the filter bag.

Most commercial disc filters utilize scrapers which are straight, fixed blades mounted with a spring mounting arrangement to permit some movement of the blade against the inflated bag. As the blade is rigid only the center portion of the bag is scraped, and the end portions which countour away from the bulged-out middle portion do not contact the scraper blade and are thus not cleaned. Such an arrangement under optimum working conditions cleans less than about 75% of the bag. If the blade tension against the bag is increased, the bag overhangs the blade greatly increasing the drag on the bag, and greatly increasing wear.

According to the present invention I have discovered that a disc filter scraper may effectively be made in three sections joined together by a flexible member to provide a scraper blade which will provide in effect a contour scraping blade for a disc filter. Such a blade includes an elongated straight section extending across a substantial portion of the mid-section of the filter bag. Two scraper end sections are flexibly joined to the middle section permitting outward movement of the middle section and provide effective scraping of the end sections of the bag as well as the mid-section.

Included among the objects and advantages of the present invention is to provide a scraper blade for a rotary disc filter which provides an effective contour shape for removing filter cake from the filter medium of the individual filter sectors.

Another object of the invention is to provide a filter scraper for disc type filters having three effective scraping edges hingedly interconnected for optimum scraping of substantially all of each filter sector surface with reduced wear on the filter medium.

A still further object of the invention is to provide a flexible filter scraper supported in three sections which permits angular movement of the three sections relative to each other for providing an effective blade contour extending along essentially all of the radial length of the filter medium on a disc filter.

Another object of the invention is to provide a mounting for a sectioned scraper blade having means for independently applying scraping pressure on the sections.

These and other objects and advantages of the invention may be readily ascertained by referring to the following description and appended illustrations in which.

In the device illustrated, a filter sector 1, which is of conventional design, is mounted with a plurality of similar members (not shown) in an annular disc arrangement, mounted on a shaft, not shown, in conventional construction. The sector is supported at its outer end to other sectors by an outer harness 2. Each sector includes an inner bell 3, which is the sector portion secured to the shaft. In conventional design, external channels on the sector body interconnect with the outlet passage of the bell, and the bell provides communication between the hollow shaft and the channels of the sectors. Each sector is individually covered by filter medium, generally a bag shaped to the sector configuration. In normal practice, the bag is tied at its inner end to the bell, and the harness 2 secures the outer end closed. For purposes of the present invention, however, the bag may be secured in any convenient manner to the sector, and the bag may be generally of any usable type of filter medium which includes natural and synthetic fibre cloth, screen, wire cloth, and the like. Also, such disc filters include a cake discharge chute on each side of each disc, adjacent to each scraper for collecting the filter cake discharged from the filter.

Figure 1:
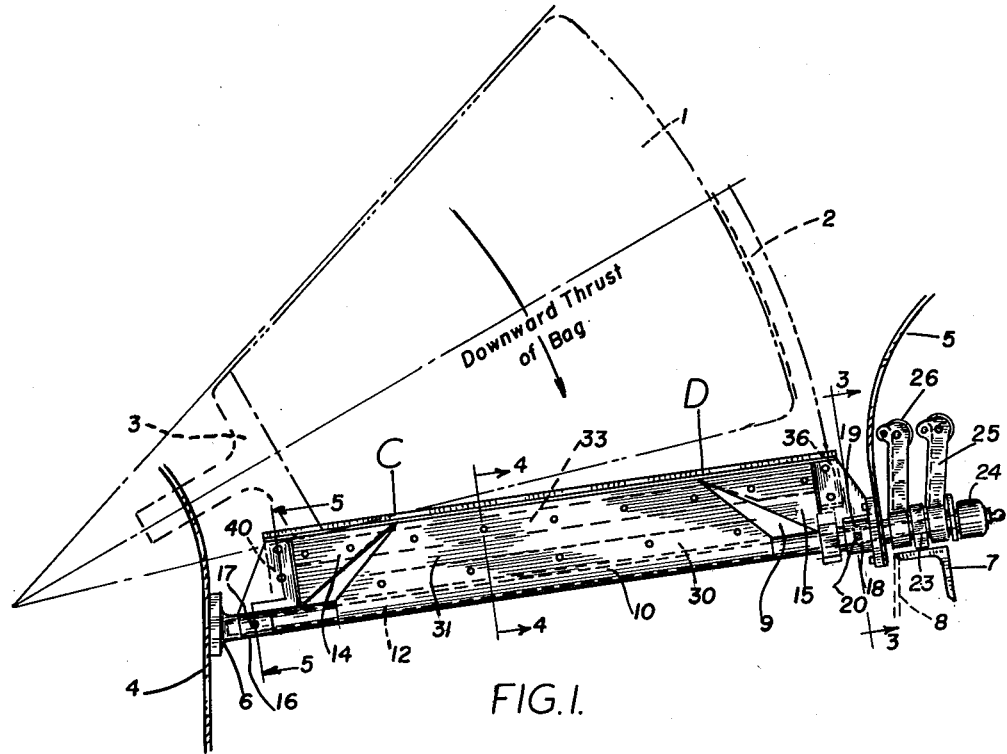
FIG. 1 is a side elevational view of a scraper according to the invention, illustrating its positioning in relation to a filter disc.

The scraper mounted on each side of each disc at the discharge thereof, as shown in FIG. 1, is supported on an inner shroud 4 and an outer shroud 5. An inner socket 6 provides a trunnion for a shaft 12 on which the scraper is mounted, explained in detail below. The outer end of the scraper is movably mounted on an angle 7 supporting it in position adjacent the filter disc. The angle 7 is secured to and mounted on outer portion 8 of the filter tank, only partially shown.

Figure 4:
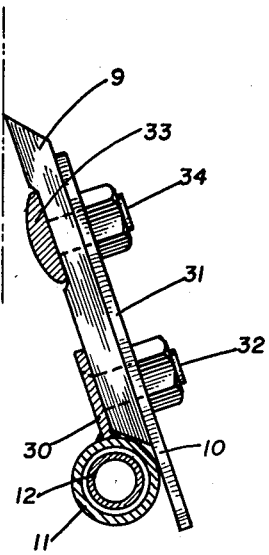
FIG. 4 is a cross-sectional view of a center portion of the scraper of the invention taken along section line 4—4 of FIG. 1.

The blade assembly of the invention includes a resilient flexible blade member 9 extending along the length of the filter medium on the sector supported by a middle retainer or support 10. A stub retainer 30, FIG. 4, is mounted on hollow shaft 11 and is secured to support 10 by bolts 32. The blade is supported by rear end retainer 14 and front end retainer 15 on either side of middle support 10. The end retainers are spaced from the middle retainer 10 to permit flexing of the rubber scraper blade therebetween, and providing angular displacement of the retainers. The middle retainer is essentially rigid so that when secured to the flexible blade, three sections are provided, hingedly joined together at C and D.

Figure 7:
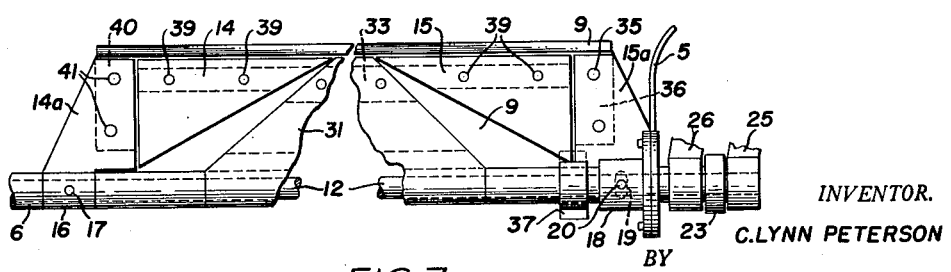
FIG. 7 is a detailed side elevational view, in partial section, of the supporting portions of a shaft mounting arrangement of a scraper according to the invention.

The scraper is mounted on co-axial shafts with the middle section 10 secured to one shaft and the two end retainers secured to the other shaft so that pressure may be independently applied on the middle and the end retainers for holding the blade contoured under pressure against the filter media of the sectors. As shown in detail in the shaft structural arrangement in FIG. 7, an inner shaft 12 extends through outer hollow shaft 11. The inner shaft 12 is journalled in the inner socket 6, and shaft 11 is rotatably supported by shaft 12. The resilient flexible blade member 9 is secured at its inner end in a vise or clamp 14a which is secured by pin 17 to shaft 12, and at its outer end by vise or clamp 15a. The vise 15a is, also, secured to shaft 12 by pin 20 and relative movement is provided by movement of the pin 20 in slots 19 in the wall of tube 11. The blade is secured to the inner vise by means of bolt and nut sets 41 and to the outer vise by bolt and nut sets 35. End retainers 14 and 15 are pinned or otherwise secured to the blade by bolt sets 39 and these retainers are spaced from the vises 14a and 15a to permit bending of the blade therebetween, and, also, they are spaced from the middle retainer 10 to permit bending of the blade therebetween. The middle retainer 10 and backing member 30 are secured to the shaft 11 on which is also secured lever arm 26. Thus the end retainers are arranged for independent pivoting in relation to the center retainer 10. A preferred structure for forcing the blade against the discs is by a spring placed on lever arms which are interconnected to the shafts. By such means a spring load is induced on all the retainers for providing correct tension of the contoured scraper blade against the bag. As is common practice in the disc filter art, a scraper is mounted on each side of each disc, and these scrapers may be interconnected. Such an arrangement holds the blades uniformly against the disc surface regardless of whether the disc is warped or not. Generally, the outer ends of the blades rest on a support, for example angle 7, and oscillate back and forth with the movement of the disc. A roller 23 provides for free movement on the angle 7.

The middle retainer, shown in detail in FIG. 4, includes an upright member 30 secured to shaft 11 as by welding or the like in position to support the blade 9. The outer support 10 is secured to the upright member 30 as by means of bolt and nut sets 32 along the middle portion 10. The support 10 is a metal plate which extends at 31 above the shaft and supports the resilient blade 9 in generally linear arrangement. An upper inner inner retainer 33 is secured to the plate 31 by means of bolt sets 34 and extends along the upper inner side of the blade. The blade 9 extends beyond the metal retainers 33 and 31 in position to scrape the disc without the metal members contacting the filter element.

Figure 3:
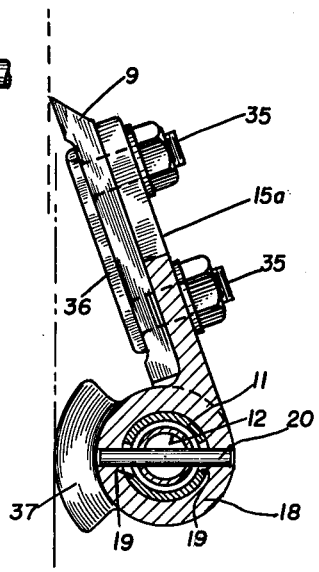
FIG. 3 is a cross-sectional view of a front end vise for holding one end of the scraper of the invention taken along section line 3—3 of FIG. 1.

The outer retainer assembly includes a sleeve 18, shown in FIG. 3, from which extends the vise 15a. A plurality of bolt and nut sets 35 secure an inner backing plate 36 to the end vise 15a holding the flexible knife blade 9 therebetween. The collar 18 is pinned by means of the pin 20 through the outer shaft 11 to the inner shaft 12. A slot 19 in the outer shaft 11 permits partial rotation of either shaft in relation to the other. An arcuate boss 37 is secured to the collar 18 and it is arranged to ride on the outer harness 2 of the disc, providing a fulcrum point for the spring-loaded lever arms.

Figure 5:
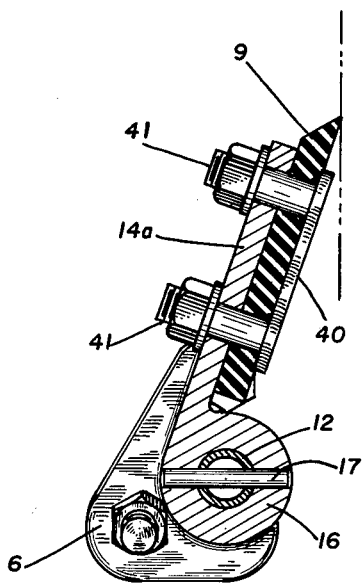
FIG. 5 is a cross-sectional view of a rear end vise for holding the scraper of the invention.

The inner or rear end vise 15a, FIG. 5, includes a collar 16 pinned by means of pin 17 to the shaft 12. The rear end vice 14a, integrally secured to the collar 16, extends therefrom in position to hold a flexible blade 9. A backing plate 40 is secured to the retainer 14a by means of bolt and nut sets 41 for holding the flexible blade.

Figure 6:
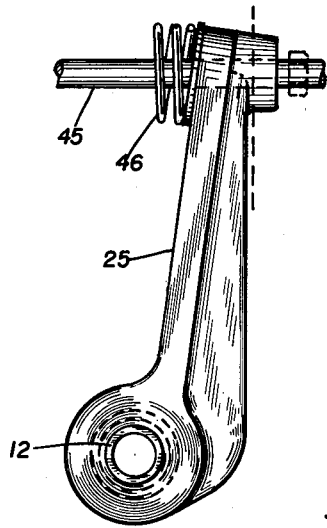
FIG. 6 is an end view of a spring-loaded lever arm of a scraper assembly according to the invention.

The spring lever arm 25, as illustrated in FIG. 6, is securely fastened to the inner shaft 12 for applying tension on the end retainers 14a and 15a. A shaft 45 extending through the upper part of the arm 25 has a helical spring 46 secured thereon, and a nut and bolt assembly, not shown, mounted on the shaft 45 is arranged to hold the spring against the arm 25. A mating member for 25 is secured to another scraper on the opposite side of the disc and it is similarly mounted on the shaft 45. The mating member, likewise, includes a spring for holding the two lever arms together under spring tension. In this manner the scraper blades are retained in relative position against the side surfaces of the disc, but are arranged to move back and forth as the disc moves out of true alignment. A grease fitting 24 provides means for lubricating the parts.

Figure 2:
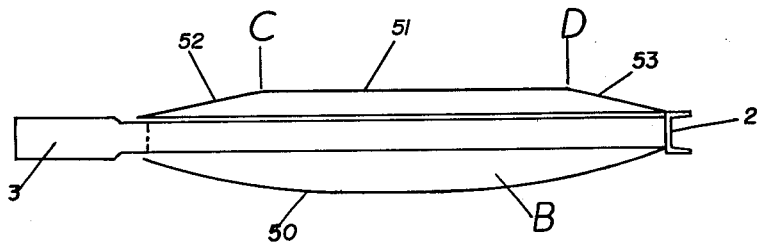
FIG. 2 is a top plan, schematic view, illustrating the relationship of normal bag bulging to filter bag contour in contact with the scraper of the invention.

The schematic view of FIG. 2 illustrates the action of the blade in relation to the bag on a filter disc sector. In this illustration, the lower portion 50 illustrates a bulged out bag B unrestricted by any blade. Since the bag is held at the outer end under the harness 2, the bell 3 at the inner end, under internal air pressure the bag B bulges in a generally smooth arcuate contour from the inner tied end to the outer fastened end. The opposite side of this sector illustrates the general configuration of the bag when restricted by a scraper blade according to the invention. In this instance, the blade includes a long center section 51 hingedly connected at C and D to end scraper sections 52 and 53 which converge inwardly toward the connections at the ends of the sector. Since the bag B is flexible, the contour of the blade is readily produced by the bag pushing against it, and the bag is readily confined by the blade so that no extensive areas of wear are produced. Further, it is apparent that the blade scrapes substantially the entire length of the filter medium along the disc side.

While the invention has been described with reference to a particular device, it is obvious that such a device may be readily changed to meet various conditions of service. For example, if it is desired to utilize a metallic blade for scraping the bag, three sections of a metal blade hingedly joined together as at the junctions C and D produces a contouring blade. These may be hinged by means of a resilient hinge member or a pivoted hinge which would permit the blade to assume the shape shown in FIG. 2. The form illustrated utilizes a center blade section of about 75% of the blade length, but this may be varied from about 50% to about 85% of the blade length. Since the bag must push out the blade, too short a middle section prevents contouring as does too long a middle section. The use of the concentric shafts is one method for individually applying scraping pressure to each of the sections of the blade for positive placement of the blade against a bag. Other methods of applying scraping pressure will be obvious since the scraper blade sections must be held with sufficient pressure against the filter medium to accomplish cake removal, and it is obvious that the sections must be permitted to move relative to each other, while under the scraping pressure, to permit the blade to contour. There are, obviously, other ways of mounting the contour blade as will occur to those skilled in the art, but there is no intent to limit the spirit of the scope of the invention to the precise details set forth in the application except insofar as defined in the following claims.

I claim:

1. A scraper for a disc type filter comprising a flexible, resilient scraper blade providing a continuous scraping edge along a filter surface to be scraped, said blade being supported so as to provide a flexible, sectioned blade arranged to be positioned in scraping relation along one side of the filter disc, said blade including at least one relatively rigid middle support section spaced from the blade edge and extending along a major portion of the length of said flexible blade and an end support section mounted on said blade on each end thereof spaced from the blade edge so as to be pivotal in relation to said middle section, shaft means for mounting said blade adjacent a filter disc, said shaft means including two concentric shafts with the two end sections interconnected to one of said shafts for conjoint movement therewith and the middle support section mounted on the other shaft for independent pivotal movement, and means arranged at one end of said blade for independently applying scraping pressure on said middle support section and on said two end support sections.

2. A scraper for a disc type filter comprising an elongated flexible blade arranged to be positioned in scraping relation with one side of a disc, a restraining member secured to said blade along a major portion of the mid-section and arranged to hold said flexible blade essentially rigid in the center thereof, a restraining member secured to said blade adjacent each end arranged to hold each end thereof essentially rigid, each end restraining member being spaced from said middle section whereby the end sections of said flexible blade are arranged to move angularly out of alignment with said middle section, a hollow shaft secured to said middle section restraining member, a second shaft extending through said hollow shaft and interconnected with each said end restraining member, and means arranged for independently applying spring-loaded pressure on each said shaft and thereby apply scraping pressure of each said blade section on an adjacent filter disc.

3. A scraper for a disc type filter comprising an elongated flexible blade arranged to be positioned in scraping relation with the filter medium of one side of a filter disc, a restraining member secured to said blade along a major portion of the mid-section and arranged to hold said flexible blade essentially rigid in the center thereof, a restraining member secured to said blade adjacent each end thereof and spaced from said middle section whereby the end sections of said flexible blade are arranged to move angularly out of alignment with said middle section, said blade having a scraping edge extended beyond said members out of disc contact, a hollow shaft secured to said middle member providing pivotal movement thereof, a second shaft extending through said hollow shaft and interconnected wtih each said end providing pivotal movement thereof independent of said middle member, and means arranged for independently applying spring-loaded pressure on each said shaft to thereby apply tension on said blade restraining members and a scraping pressure of the co-acting blade section on an adjacent filter disc.

4. A scraper assembly for a disc type filter comprising, an elongated, flexible blade of substantial width arranged to be maintained at an acute angle to the surface of the disc type filter in scraping relation thereto, at least one restraining member secured to said blade intermediate the ends thereof and mounted so as to prevent curling of the intermediate section of said flexible blade, a restraining member secured to each end of said flexible blade and each adjacent to and spaced from such intermediate restraining member whereby to permit said end restraining members and blade to move generally angularly out of alignment with said intermediate restraining member, all said restraining members being individually pivotally mounted on shaft means, and means at one end of said blade arranged for applying scraping pressure independently on each said intermediate member and on said two end members.

5. A scraper assembly according to claim 4 in which said shaft means is a concentric pair of shafts and each intermediate restraining member is mounted for pivotal movement with one of said pairs of shafts and the two end restraining members are mounted for pivotal movement with said other shaft.

6. A scraper assembly according to claim 4 in which said intermediate restraining member is a single member extending from 50–85% of the length of the blade.

7. A scraper assembly according to claim 4 in which said at least one intermediate restraining member extends about 75% of the length of said blade.

8. A scraper assembly for scraping both sides of a disc type filter assembly comprising an elongated flexible blade of substantial width arranged to be positioned on each side of a filter disc with each positioned at an acute angle to the surface of the filter disc in scraping relation thereto, at least one restraining member secured to said blade intermediate the ends thereof and mounted so as to prevent curling of the intermediate section of said flexible blade, a restraining member secured to each end of said flexible blade and each adjacent to and spaced from such intermediate restraining member whereby to permit said end restraining members and blade to move generally angularly out of alignment with said intermediate restraining member, the restraining members secured to each said blade being mounted on a pair of concentric shafts, with the intermediate restraining member secured for pivotal movement to a first of said shafts and the two end restraining members secured for pivotal movement to the second shaft of the concentric pair, means inclusive of spring detent means arranged at one end of said blades interconnecting said first shafts for applying substantially uniform scraping pressure to opposite intermediate sections of the filter disc, and means inclusive of spring detent means interconnecting said two second shafts for applying substantially uniform scraping pressure to the ends of the blade on each side of a filter disc independently of said intermediate sections.

References Cited in the file of this patent

UNITED STATES PATENTS 2,243,559    Griffith  ---------------- May 27, 1941
2,601,664    Nesson  ---------------- June 24, 1952